United States Patent [19]
Chou

[11] Patent Number: 6,081,953
[45] Date of Patent: Jul. 4, 2000

[54] HAND TOOL WITH WIRE STRIPPER HANDLE

[76] Inventor: Paul Chou, P.O. Box 63-247, Taichung, Taiwan

[21] Appl. No.: 09/351,779

[22] Filed: Jul. 12, 1999

Related U.S. Application Data

[63] Continuation-in-part of application No. 08/977,631, Nov. 25, 1997, Pat. No. 5,956,789.

[51] Int. Cl.$^7$ ...................................................... B25B 25/00
[52] U.S. Cl. .................................. 7/108; 30/90.1; 81/9.4
[58] Field of Search .............................. 7/108, 107, 142, 7/158, 168; 81/9.4, 177.4, 439, 490; 30/90.1, 90.6, 125

[56] References Cited

U.S. PATENT DOCUMENTS

| | | | |
|---|---|---|---|
| 4,607,544 | 8/1986 | Jewell, Jr. ................................... | 81/9.4 |
| 5,535,519 | 7/1996 | Brimmer ................................... | 30/90.1 |
| 5,669,132 | 9/1997 | Brimmer ................................... | 30/90.1 X |
| 5,732,471 | 3/1998 | Korinek et al. ......................... | 81/9.4 X |

*Primary Examiner*—David A. Scherbel
*Assistant Examiner*—Anthony Ojini
*Attorney, Agent, or Firm*—Alan Kamrath; Oppenheimer Wolff & Donnelly LLP

[57] ABSTRACT

A hand tool includes a handle with a tool attached thereto. The handle includes a compartment defined by a bottom wall and two side walls. A press block includes two ends in guided sliding engagement with the side walls to thereby allow the press block to be slidable relative to the side walls of the handle upon manual operation on the press block. A first wire stripping member is provided on the bottom wall of the compartment and includes a number of first notches of different curvatures. A second wire stripping member is provided on the press block and includes a number of second notches of different curvatures for stripping insulation from electrical wires of different gauges when the first notches and the second notches come together in a closed state as a result of manual operation on the press block.

13 Claims, 6 Drawing Sheets

HAND TOOL WITH WIRE STRIPPER HANDLE

CROSS REFERENCE TO RELATED APPLICATION

This is a continuation-in-part application of U.S. patent application Ser. No. 08/977,631 filed on Nov. 25, 1997 U.S. Pat. No. 5,956,789.

BACKGROUND OF THE INVENTION

1. Field of the Invention

The present invention relates to a hand tool such as a screwdriver, wrench, or spanner that has a handle capable of providing a wire stripping function as well as securely connecting a terminal to an end of a wire.

2. Description of the Related Art

A hand tool, e.g., a screwdriver, spanner, wrench, etc., generally includes a handle only for grasp without providing any additional function. Applicant's U.S. patent application Ser. No. 08/977,631 filed on Nov. 25, 1997 discloses a multifunctional screwdriver that has a handle capable of driving screws, stripping wires, and connecting a terminal to an end of a wire.

The present invention is intended to provide a multifunctional hand tool in this regard.

SUMMARY OF THE INVENTION

It is a primary object of the present invention to provide an improved handle tool with a number of functions including wire stripping, terminal connection, and fastener driving.

A hand tool in accordance with the present invention comprises:

- a handle with a tool attached thereto, the handle including a compartment defined by a bottom wall and two side walls;
- a press block including two ends in guided sliding engagement with the side walls to thereby allow the press block to be slidable relative to the side walls of the handle upon manual operation on the press block;
- a first wire stripping member provided on the bottom wall of the compartment and including a plurality of first notches of different curvatures; and
- a second wire stripping member provided on the press block and including a plurality of second notches of different curvatures for stripping insulation from electrical wires of different gauges when the first notches and the second notches come together in a closed state as a result of manual operation on the press block.

Biasing means is provided for biasing the second wire stripping member away from the first wire stripping member. In an embodiment of the invention, the biasing means includes a pin extended through the press block and the bottom wall of the compartment. An end of the pin that extends through the bottom wall of the compartment has a screw hole. A screw is engaged with the screw hole to retain the end of the pin in place. An elastic member is mounted around the pin and attached between the press block and the bottom wall of the compartment.

A second pin is spaced from the first-mentioned pin and extended through the press block and the bottom wall of the compartment. An end of the second pin that extends through the bottom wall of the compartment has a second screw hole. A second screw is engaged with the second screw hole to retain the end of the second pin in place. At least one second tool is pivotally connected to the second pin and has a loop section through which the second pin extends.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
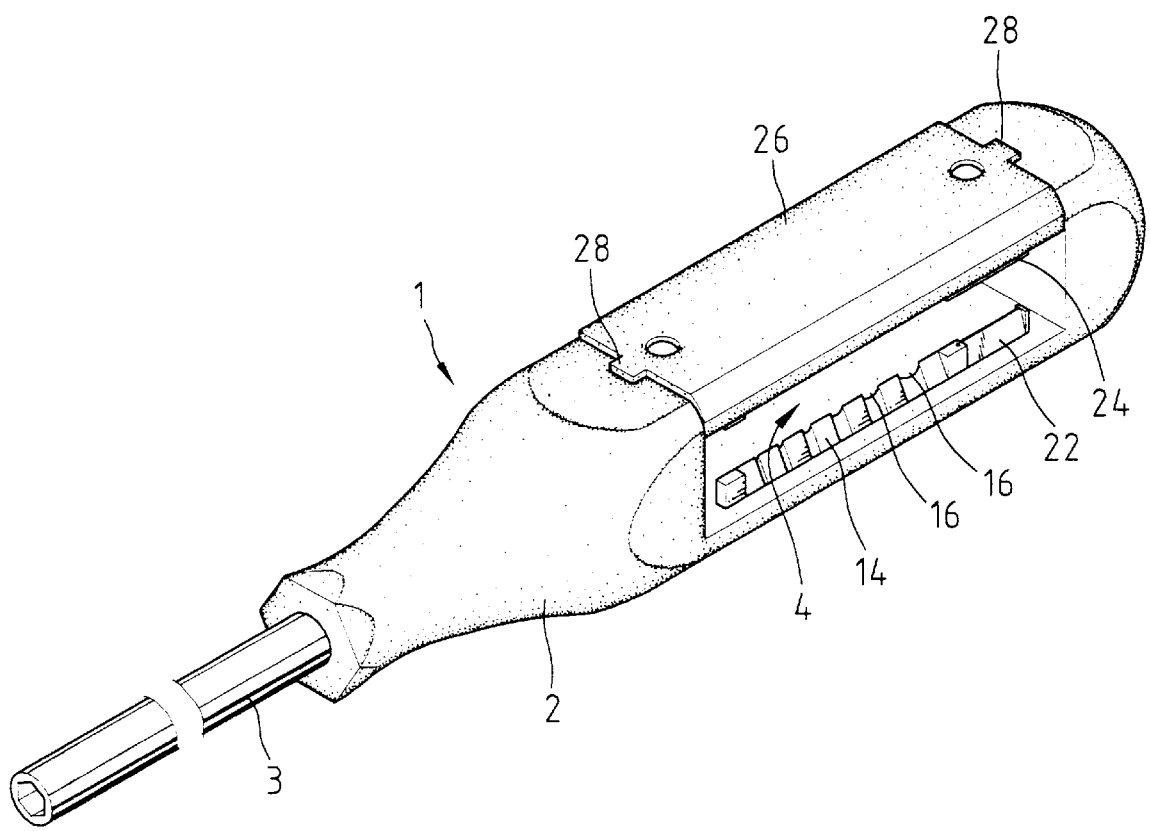
FIG. 1 is a perspective view of a multifunctional hand tool in accordance with the present invention.
Figure 2:
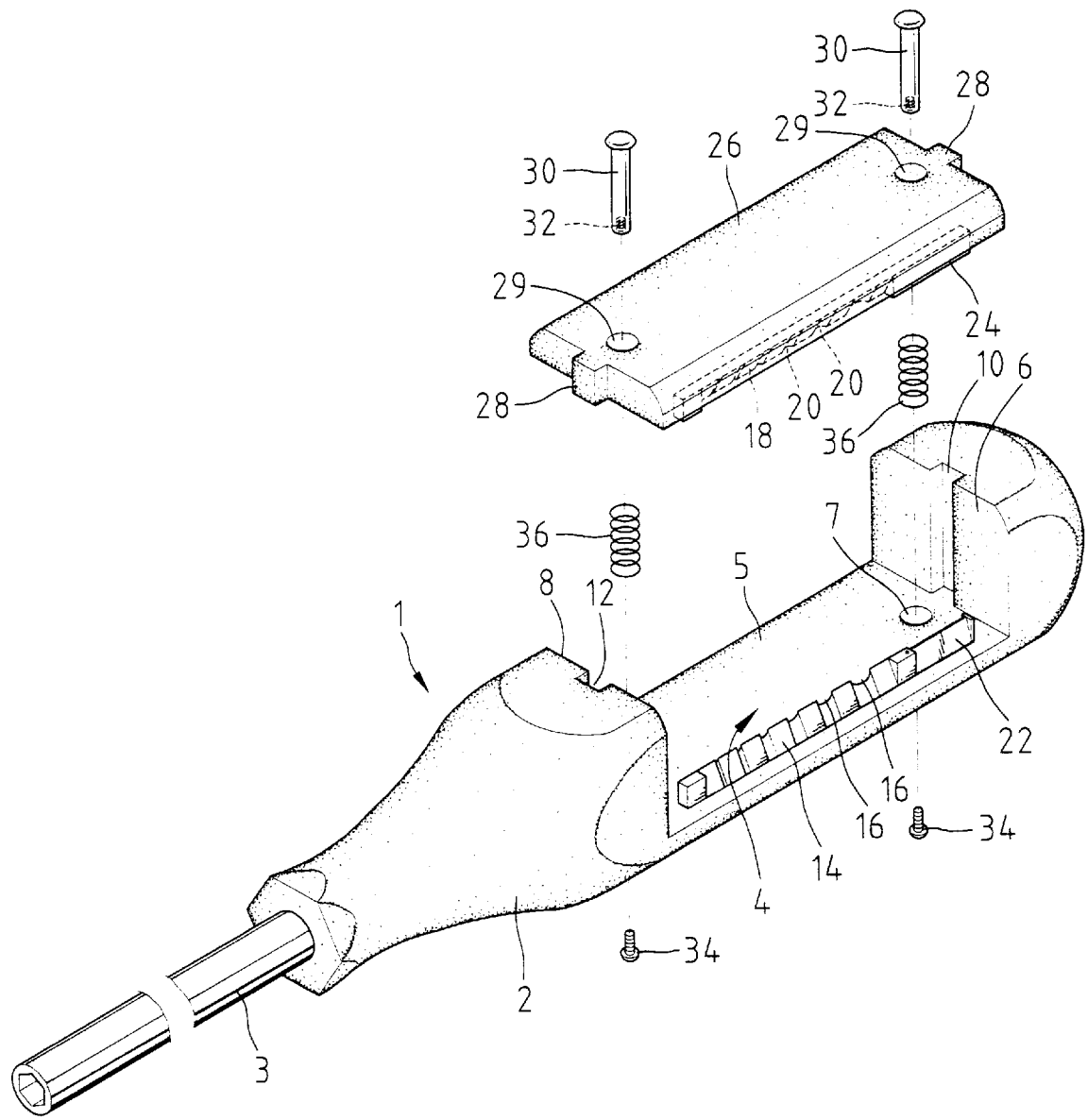
FIG. 2 is an exploded perspective view of the multifunctional hand tool in accordance with the present invention.

Referring to FIGS. 1 through 9 and initially to FIGS. 1 and 2, a multifunctional hand tool in accordance with the present invention is designated by "1" and generally includes a handle 2 and a shank 3. A screwdriver bit (not shown) may be attached to the shank 3 so as to act as a screwdriver. Nevertheless, the hand tool 2 is not limited to act as a screwdriver. Namely, the shank 3 may be replaced by an end portion of a spanner or the like.

The handle 2 includes a compartment 4 defined by a bottom wall 5 and two side walls 6 and 8. Each side wall 6, 8 includes a vertical groove 10, 12 defined therein. The bottom wall 5 includes a lower wire stripping member 14 and a lower terminal connecting member 22 formed thereon. The lower wire stripping member 14 includes a plurality of notches 16 of different curvatures for stripping insulation from electrical wires of different gauges.

A press block 26 is slidably mounted to the handle 2. In this embodiment, the press block 26 includes a slider 28 slidably guided in an associated vertical groove 10, 12 of the handle 2. The press block 26 includes an upper wire stripping member 18 and an upper terminal connecting member 24 formed on an underside thereof. The upper wire stripping member 18 includes a plurality of notches 20 of different curvatures for stripping insulation from electrical wires of different gauges.

The press block 26 further includes two through-holes 29. A pin 30 is extended through each hole 29 and a through-hole 7 in the bottom wall 5 of the handle 2. A screw 34 is provided to engage with a screw hole 32 defined in an end of the each 30. In addition, an elastic member 36 is mounted around each pin 30 and attached between the bottom wall 5 of the handle 2 and the underside of the press block 26.

Figure 3:
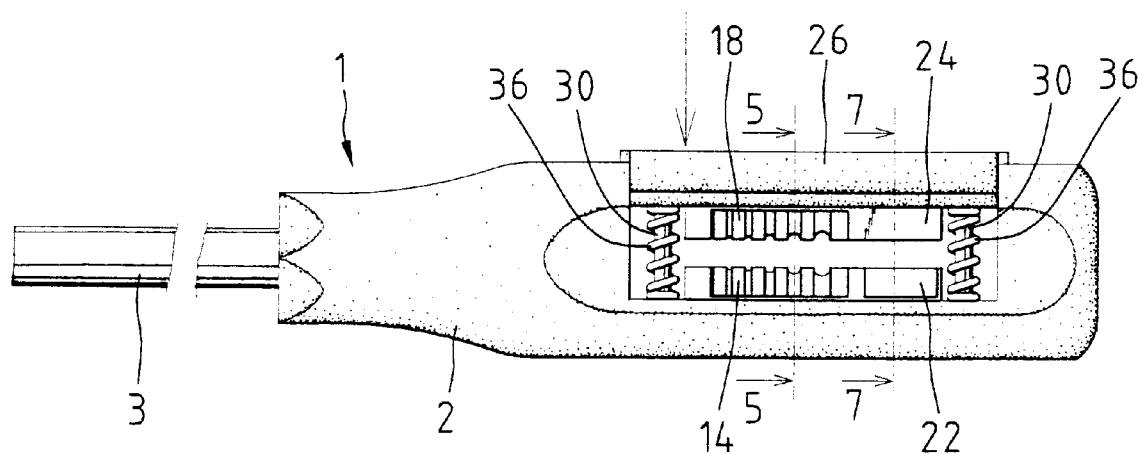
FIG. 3 is a side view of the multifunctional hand tool in accordance with the present invention.
Figure 4:
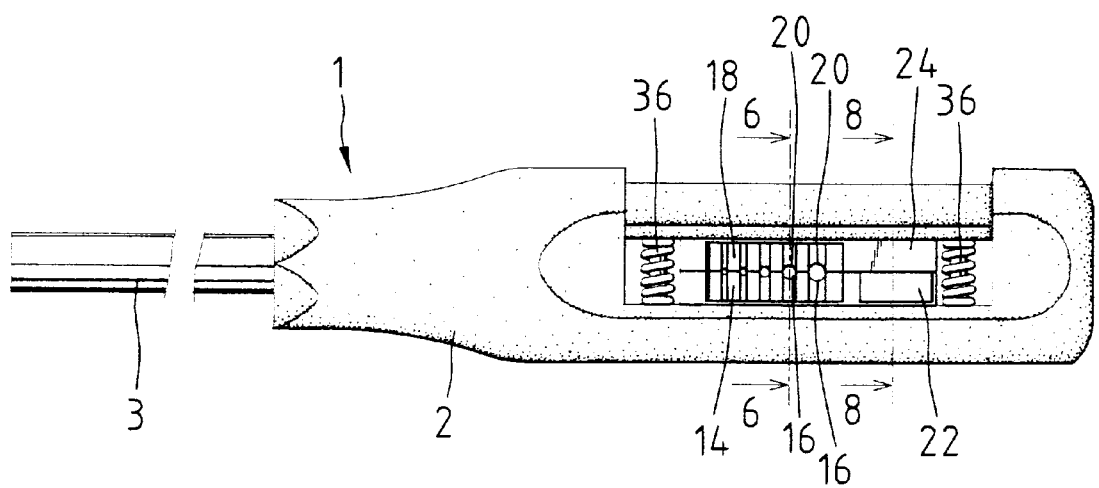
FIG. 4 is a side view similar to FIG. 3, wherein a press block is pressed.
Figure 5:
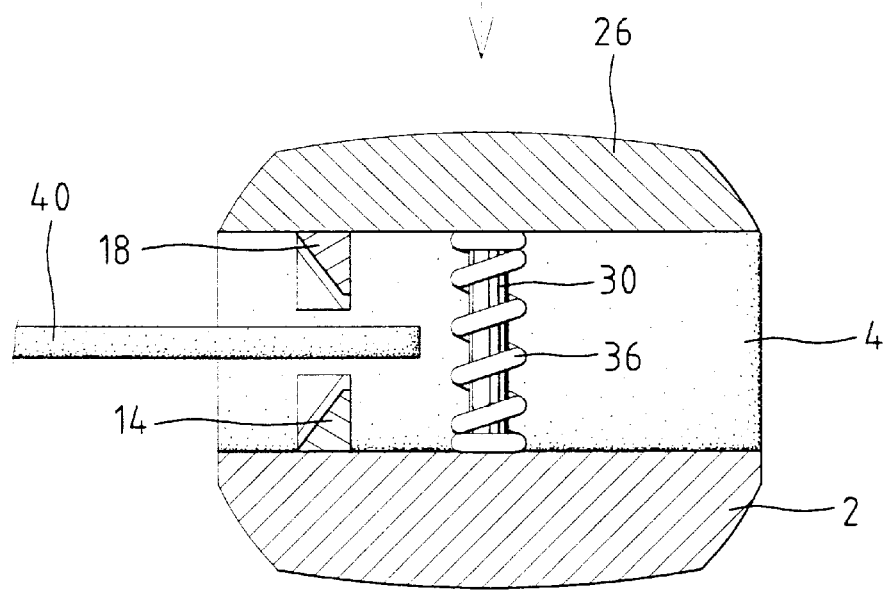
FIG. 5 is a sectional view taken along line 5—5 in FIG. 3.
Figure 6:
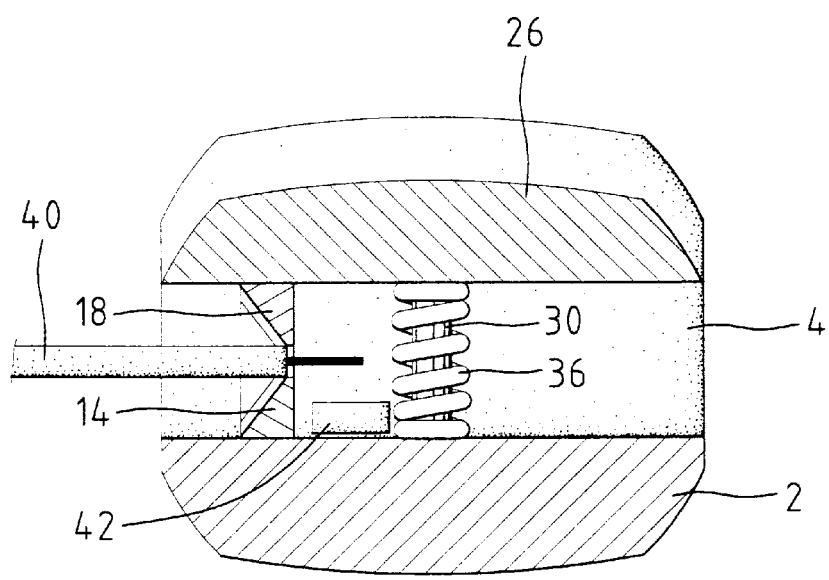
FIG. 6 is a sectional view taken along line 6—6 in FIG. 4.

Referring to FIGS. 3 and 5, when an electrical wire 40 is to be stripped, an end of the wire 40 is inserted into the compartment 4 of the handle 2, best shown in FIG. 5. The press block 26 is pressed downward such that the upper and lower wire stripping members 18 and 14 contact with each other. The wire 40 is tightly held between two aligned notches 20 and 16 of the upper and lower wire stripping members 18 and 14. The notches 20 and 16 have sharp edges (see FIGS. 5 and 6) to cut the insulating 42 from the wire 40. The cut insulating 42 falls onto the bottom wall 4 of the handle 2, which can be removed later. After stripping, the handle 2 is released, the press block 26 is returned to its initial position by the springs 36. Movement of the press block 26 is smooth, as the sliders 28 of the press block 26 are guided in the vertical grooves 10 of the handle 2.

Figure 7:
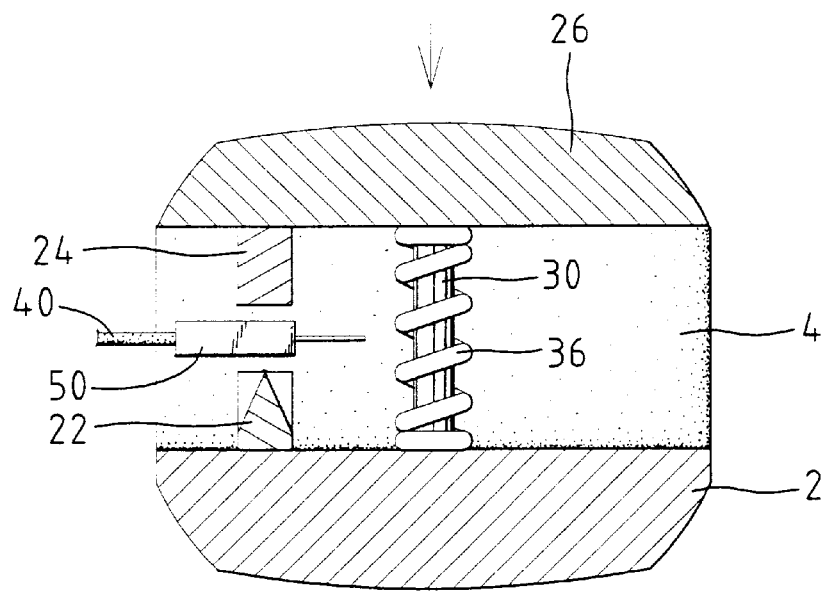
FIG. 7 is a sectional view taken along line 7—7 in FIG. 3.
Figure 8:
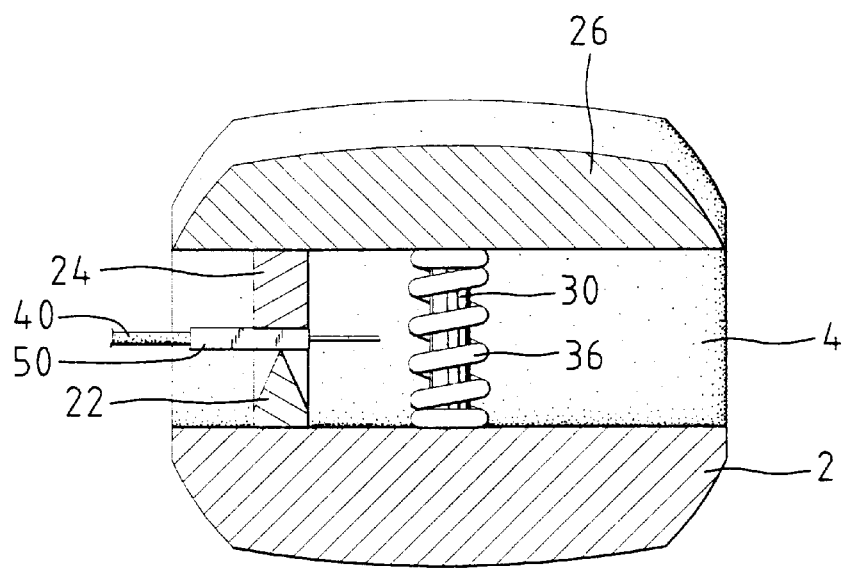
FIG. 8 is a sectional view taken along line 8—8 in FIG. 4.

Referring to FIGS. 3 and 7, when a terminal 50 is to be attached to an end (not labeled) of a wire 40, the terminal 50 and the end of the wire 40 are inserted into the compartment 4 of the handle 2, best shown in FIG. 7. The press block 26 is pressed downward such that the upper and lower terminal connecting members 24 and 22 contact with each other. The wire end and the terminal 50 are securely connected together, as they are compressed by the upper and lower terminal connecting members 24 and 22 when the user applies a force, as shown in FIG. 8. The handle 2 is released such that the press block 26 is returned to its initial position by the springs 36. Again, movement of the press block 26 is smooth, as the sliders 28 of the press block 26 are guided in the vertical grooves 10 of the handle 2. It is appreciated that the grooves 10 and 12 may be defined in the end walls of the press block 26 instead of the handle 2, and the sliders 28 may be formed on the side walls 6 and 8 of the handle 2 instead of the press block 26.

Figure 9:
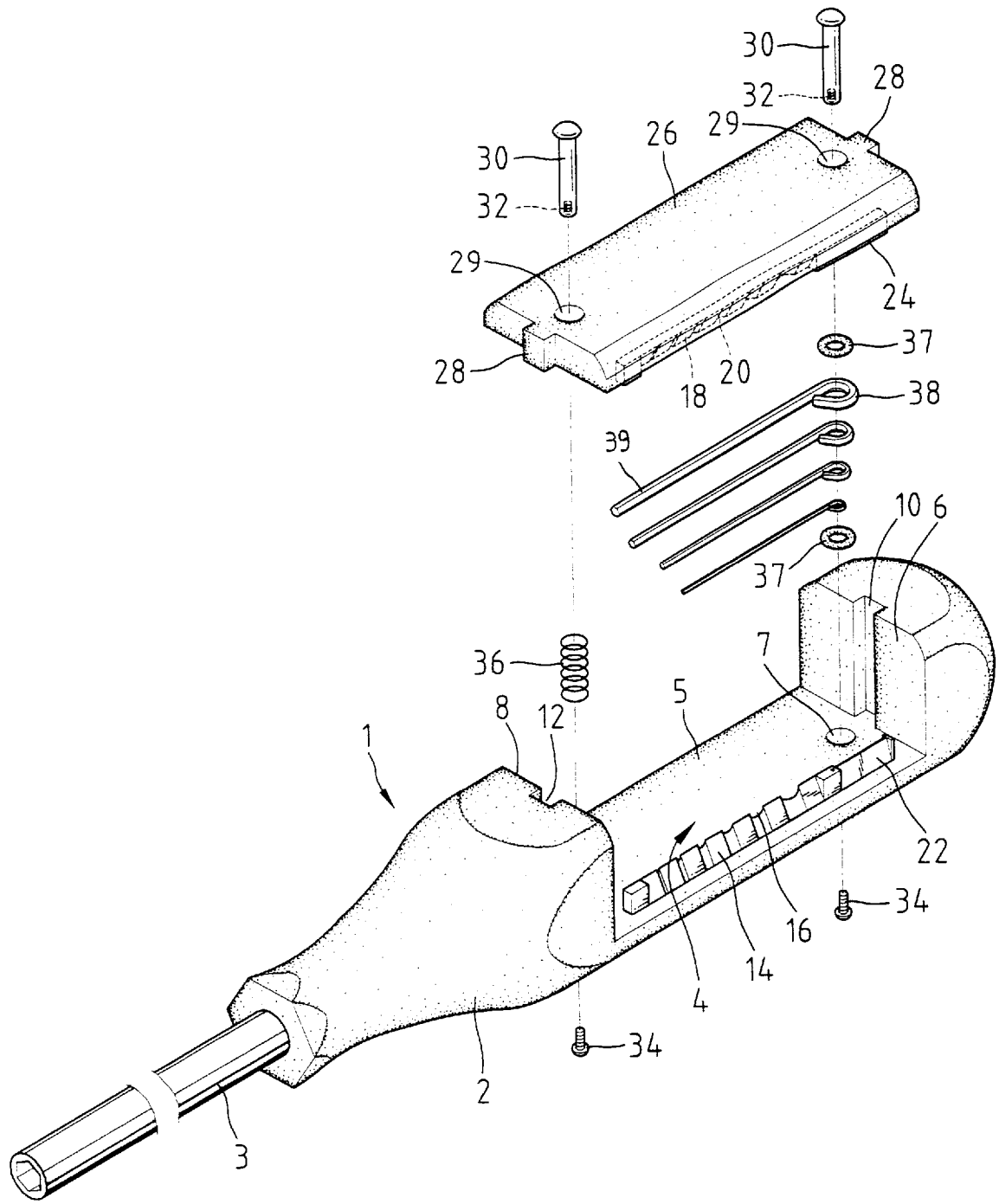
FIG. 9 is an exploded perspective view of a modified embodiment of the multifunctional hand tool in accordance with the present invention

FIG. 9 illustrates a modified embodiment of the invention, wherein one of the elastic members 36 in the first embodiment is replaced by a plurality of tools (e.g., hexagonal wrenches 39) sandwiched between two washers 37. Each tool 39 includes a loop section 38 so as to be pivotally mounted around the pin 30. Thus, the hand tool of the present invention may provide an additional function of hexagonal wrenches.

According to the above description, it is appreciated that the hand tool in accordance with the present invention provides a number of functions including wire stripping, terminal connection, and fastener driving.

Although the invention has been explained in relation to its preferred embodiment, it is to be understood that many other possible modifications and variations can be made without departing from the spirit and scope of the invention as hereinafter claimed.

What is claimed is:

1. A hand tool comprising:
    a handle with a tool attached thereto, the handle including a compartment defined by a bottom wall and two side walls;
    a press block including two ends in guided sliding engagement with the side walls to thereby allow the press block to be slidable relative to the side walls of the handle upon manual operation on the press block;
    a first wire stripping member provided on the bottom wall of the compartment and including a plurality of first notches of different curvatures; and
    a second wire stripping member provided on the press block and including a plurality of second notches of different curvatures for stripping insulation from electrical wires of different gauges when the first notches and the second notches come together in a closed state as a result of manual operation on the press block.

2. The hand tool as claimed in claim 1, further comprising means for biasing the second wire stripping member away from the first wire stripping member.

3. The hand tool as claimed in claim 2, wherein the biasing means includes:
    a pin extended through the press block and the bottom wall of the compartment, an end of the pin that extends through the bottom wall of the compartment having a screw hole;
    a screw engaged with the screw hole to retain the end of the pin in place; and
    an elastic member mounted around the pin and attached between the press block and the bottom wall of the compartment.

4. The hand tool as claimed in claim 3, further comprising:
    a second pin spaced from the first-mentioned pin and extended through the press block and the bottom wall of the compartment, an end of the second pin that extends through the bottom wall of the compartment having a second screw hole;
    a second screw engaged with the second screw hole to retain the end of the second pin in place; and
    at least one second tool each having a loop section through which the second pin extends, thereby pivotally connecting said at least one second tool to the second pin.

5. The hand tool as claimed in claim 1, further comprising:
    a pin extended through the press block and the bottom wall of the compartment, an end of the pin that extends through the bottom wall of the compartment having a screw hole;
    a screw engaged with the screw hole to retain the end of the pin in place; and
    at least one second tool each having a loop section through which the pin extends, thereby pivotally connecting said at least one second tool to the pin.

6. The hand tool as claimed in claim 1, wherein each said side wall of the compartment includes a groove, and wherein each said end of the press block includes a slider that is slidably guided in an associated said groove.

7. The hand tool as claimed in claim 1, further comprising:
    a first terminal connecting member provided on one of the bottom wall and the side walls of the compartment; and
    a second terminal connecting member provided on the press block;
    wherein the first terminal connecting member and the second terminal connecting member are adapted to securely attach a terminal to an end of an electrical wire when the first terminal connecting member and the second terminal connecting member come together in a closed state upon manual operation of the press block.

8. The hand tool as claimed in claim 7, further comprising means for biasing the second wire stripping member away from the first wire stripping member.

9. The hand tool as claimed in claim 8, wherein the biasing means includes:
    a pin extended through the press block and the bottom wall of the compartment, an end of the pin that extends through the bottom wall of the compartment having a screw hole;
    a screw engaged with the screw hole to retain the end of the pin in place; and an elastic member mounted around the pin and attached between the press block and the bottom wall of the compartment.

10. The hand tool as claimed in claim 9, further comprising:
   a second pin spaced from the first-mentioned pin and extended through the press block and the bottom wall of the compartment, an end of the second pin that extends through the bottom wall of the compartment having a second screw hole;
   a second screw engaged with the second screw hole to retain the end of the second pin in place; and
   at least one second tool each having a loop section through which the second pin extends, thereby pivotally connecting said at least one second tool to the second pin.

11. The hand tool as claimed in claim 7, further comprising:
   a pin extended through the press block and the bottom wall of the compartment, an end of the pin that extends through the bottom wall of the compartment having a screw hole;
   a screw engaged with the screw hole to retain the end of the pin in place; and
   at least one second tool each having a loop section through which the pin extends, thereby pivotally connecting said at least one second tool to the pin.

12. The hand tool as claimed in claim 7, wherein the first terminal connecting member is provided on the bottom wall of the compartment of the handle.

13. The hand tool as claimed in claim 7, wherein each said side wall of the compartment includes a groove, and wherein each said end of the press block includes a slider that is slidably guided in an associated said groove.

* * * * *